(12) United States Patent
O'Rourke

(10) Patent No.: US 8,400,510 B2
(45) Date of Patent: Mar. 19, 2013

(54) NIGHT VISION SYSTEM

(75) Inventor: Brian O'Rourke, Virginia Beach, VA (US)

(73) Assignee: Devcar, LLC, Virginia Beach, VA (US)

( * ) Notice: Subject to any disclaimer, the term of this patent is extended or adjusted under 35 U.S.C. 154(b) by 507 days.

(21) Appl. No.: 12/589,695

(22) Filed: Oct. 27, 2009

(65) Prior Publication Data

US 2010/0103267 A1  Apr. 29, 2010

Related U.S. Application Data

(60) Provisional application No. 61/197,259, filed on Oct. 27, 2008.

(51) Int. Cl.
*H04N 5/33* (2006.01)
(52) U.S. Cl. .................. 348/164; 348/135; 348/158
(58) Field of Classification Search .................. 348/158, 348/E07.085, 36, 135, 164; 350/139, 145, 350/174, 538, 540
See application file for complete search history.

(56) References Cited

U.S. PATENT DOCUMENTS

| | | | | |
|---|---|---|---|---|
| 4,449,787 A * | 5/1984 | Burbo et al. | ................... | 313/524 |
| 4,563,061 A * | 1/1986 | Ellis | ............... | 359/364 |
| 4,775,217 A * | 10/1988 | Ellis | ............... | 313/524 |
| 4,828,378 A * | 5/1989 | Ellis | ............... | 359/400 |
| 5,371,355 A * | 12/1994 | Wodecki | ............... | 250/214 VT |
| 5,617,257 A * | 4/1997 | Sheehy et al. | ................ | 359/818 |
| 5,619,807 A * | 4/1997 | Conrad | ............ | 34/414 |
| 5,629,807 A * | 5/1997 | Hall | .............. | 359/630 |
| 5,648,862 A * | 7/1997 | Owen | ............ | 398/128 |
| 5,703,354 A * | 12/1997 | Wannagot et al. | ....... | 250/214 VT |
| 6,008,779 A * | 12/1999 | Ellis | ................... | 345/8 |
| 6,087,660 A * | 7/2000 | Morris et al. | ................. | 250/330 |
| 6,271,511 B1 * | 8/2001 | Pierle | ..................... | 250/214 VT |
| 6,411,451 B1 * | 6/2002 | Fliss et al. | .................... | 359/890 |
| 6,560,029 B1 * | 5/2003 | Dobbie et al. | ............... | 359/631 |
| 6,862,748 B2 * | 3/2005 | Prendergast | ...................... | 2/422 |
| 7,211,778 B1 * | 5/2007 | Smith et al. | .................. | 250/207 |
| 7,219,370 B1 * | 5/2007 | Teetzel et al. | ...................... | 2/6.2 |
| 8,243,103 B2 * | 8/2012 | Dobbie et al. | ................ | 345/666 |
| 2002/0120979 A1 * | 9/2002 | Prendergast | ...................... | 2/422 |
| 2003/0015662 A1 * | 1/2003 | Yang et al. | ..................... | 250/330 |
| 2004/0181855 A1 * | 9/2004 | Prendergast | ...................... | 2/422 |
| 2006/0081778 A1 * | 4/2006 | Warner et al. | ................. | 250/330 |
| 2007/0084985 A1 * | 4/2007 | Smith et al. | ................. | 250/207 |
| 2007/0114252 A1 * | 5/2007 | Gruebel et al. | ............... | 224/181 |
| 2007/0214551 A1 * | 9/2007 | Teetzel et al. | .................... | 2/422 |
| 2008/0007826 A1 * | 1/2008 | Smith et al. | .................. | 359/407 |
| 2010/0302282 A1 * | 12/2010 | Dobbie et al. | ................ | 345/666 |
| 2012/0257005 A1 * | 10/2012 | Browne | .......................... | 348/36 |

\* cited by examiner

*Primary Examiner* — Lashonda Jacobs
(74) *Attorney, Agent, or Firm* — Williams Mullen

(57) ABSTRACT

A night vision system includes an image intensifier tube and circuitry coupled to a digital storage medium that periodically samples a signal provided by the image intensifier tube and stores the sampled image to be viewed in near real time or at a later date by a data analyst. The night vision system includes a casing surrounding the image intensifier tube and the associated circuitry along with a port for accepting a power and/or signal cable for providing power to the image intensifier tube and image signal data to the digital storage medium. The system may further include a daytime camera and a switch for toggling the image signal data input to the digital storage medium between the daytime camera and the image intensifier tube.

18 Claims, 12 Drawing Sheets

NIGHT VISION SYSTEM

The present application relates to and claims priority from U.S. Provisional Patent Application Ser. No. 61/197,259 filed on Oct. 27, 2008.

The present application did not receive any federal research and/or development funding.

TECHNICAL FIELD

Generally, the present invention relates to a night vision system deployed by an operator in a field environment. The system may be coupled onto the personal clothing, holsters, protective equipment or the like and used to capture images and store them onto a digital storage medium. The system includes an image intensifier device that converts night time images into digital images that may be viewed in real-time and which are stored in a data storage medium arranged on the operator or at a separate location remote from the image intensifier tube. When deployed as a helmet mounted night vision system, a pair of cables, each having a connector arranged at an end thereof, couple the image intensifier tube and the storage medium together. The digital image may be uploaded or downloaded to create viewable images on a screen and viewed in real-time or at a later date. Otherwise, the night vision system may be arranged as an element of the terrain and arranged to capture images of a specific area or object of interest. In this instance, the night vision system may be equipped with an electronic date stamp for integrating a part date of capture on a particular image. The invention may be useful in sporting activities such as skydiving where hands-free operations are desired.

BACKGROUND OF THE INVENTION

Night vision devices include any system that takes an image displayed in low-light or no light conditions. The systems include any active or passive infra red detection systems. The term "field environment" may comprise any environment, including rural and urban environments, in which a surveillance and/or operational action is taken. The night vision system is an image intensifier tube and associated circuitry and may comprise an integrated power supply coupled to a powered memory storage device having an independent integrated power supply.

Digital camera technology typically includes the use of a sensor that converts light into electrical charges. The image sensor used in many digital cameras is a charge coupled device (CCD). Otherwise, a digital camera may use a complementary metal oxide semiconductor (CMOS) device instead. Both CCD and CMOS image sensors convert light into electrons.

There are a variety of lenses on currently on the market for use with digital cameras. Likewise, night vision devices such scopes, monoculars and binoculars are known. There are certain devices such as sleeves that may be used to couple a scope or monocular to a digital camera to convert it into a device that may be used in low or no light conditions. High quality night time pictures may be taken with such combined devices.

There are several disadvantages realized when performing mobile surveillance with the combined devices. The size of the night vision scope coupled to a camera may exceed two feet in length. Moreover, the sleeve coupling the night vision scope to the camera cannot adequately support the weight of the scope or camera. Both, the scope and camera must be held in one's hands during operation. Thus, the combined scope and camera are not for use as a hands free system. If the scope and camera are mounted on a tripod or other fixed structure, they are rendered immobile and cannot be used in an environment where mobility is necessary. Thus, one cannot carry the camera with a night vision scope coupled thereto and operate it in a "hands free" manner. For purposes of this disclosure, the term "hands free" with respect to operation of the device should be construed to mean a device that is arranged on a user, activated by the user, and thereafter begins taking images and continues doing so until such time as either a power source discharges to such a level that the device cannot properly operate or the user deactivates the device. Moreover, "hands free" means that the size and components of the device is easily carried such that the operator's hands are free to perform other tasks.

SUMMARY OF THE INVENTION

There is a great need in the special operations, infantry, law enforcement community for a helmet mounted night vision system that records digital images of night time operations. The present invention aims to satisfy this need. In one instance, the night vision system of the present invention comprises a helmet-mounted image intensifier tube or night vision device having a first end with an objective lens that accepts photons and a second end that provides digital signals that include images to a single output port or multiple outputs. The image intensifier tube converts a low light image into a plurality of digital images that are decoded to create surveillance images and sounds. The system may include the image intensifier tube, at least one microphone, and a memory to record both audio and video signals output from the image intensifier tube and microphone. Otherwise, a memory, preferably solid state, may be coupled to the image intensifier to periodically sample images provided by the image intensifier and to record the sounds of the microphone and images provided by the image intensifier tube. A power source provides power to the helmet mounted image intensifier tube and is connected to the image intensifier tube through control circuitry. A casing houses the helmet mounted image intensifier tube and may include a fastening means that couples the night vision system to a harness currently in use by combat and police organizations.

In an embodiment where the image intensifier tube includes an integrated onboard power source, a back end of the casing includes at least one signal/power port and is at least partially removable to create access openings to battery compartments. That is, the casing includes recesses with access openings for depositing batteries into the recesses to create a voltage potential in the onboard power source. The signal-power port is arranged in the casing for accepting at least a signal end of a cable, such as IEEE1394, FireWire, I-Link, camera link, Egig, USB etc. The casing may be formed from lightweight materials such as aluminum, composite materials or the like and include integrated electromagnetic shielding for protecting the various internal components when exposed to high electric or magnetic fields. The cable has a first signal end arranged in the signal-power port of the casing of the image intensifier tube. The signal cable includes a second signal end that transmits at least digital images there through to a memory remote from the intensifier tube. In an embodiment where the image intensifier tube is mounted atop a helmet, a pair of cables are coupled together substantially near the night vision device if the memory device is remote from the night vision device. In one instance, the image intensifier tube may be mounted atop a protective helmet worn by a user. In an alternative embodiment, the image intensifier tube may be mounted onto a side of the protective helmet via a Velcro strap that passes across the top of the protective helmet to couple the image intensifier tube to a memory storage medium and power source housed in a control unit. In another instance, an electronic storage medium has a signal/power port for accepting the second end of the second cable to receive digital images from the helmet-mounted image intensifier tube. A second power source connects to the electronic storage medium for providing power thereto. This second power source is coupled to the first power source and includes circuitry that monitors the voltage levels of the first and second power sources. The voltage levels are compared and if necessary, the second power source diverts energy to the first power source to assist in continuing the operation of the image intensifier tube. The memory device may comprise a second camera for use during daytime operations. An onboard switching device may include circuitry that comprises a photocell for determining whether the second camera (daytime) is used or the first camera (nighttime) is used. Otherwise, the switching device may be a manual switch operated by the user to switch between the daytime camera and image intensifier tube.

The image intensifier tube may comprise a replaceable first lens, typically with a field of view of substantially 70-100 degrees, preferably 90-100 degrees and arranged at the first end of the helmet-mounted image intensifier tube. This first lens is preferably interchangeable and may include an adjustable zoom lens for capturing close up images of an object of interest. The helmet-mounted intensifier tube further includes a circuit that steps up the low voltage potential in the first power source to a high voltage potential. A photocathode is arranged in proximity to the first lens. The photocathode converts photons received by the first lens into a first plurality of electrons. A micro-channel plate is arranged in proximity to the photocathode to convert the first plurality of electrons into a second plurality of electrons having a larger magnitude than the first plurality of electrons. A screen is arranged in proximity to the micro-channel plate and is struck by the second plurality of electrons to reproduce the image of the object of interest. The screen comprises a material that fluoresces when struck by the second plurality of electrons to produce an accurate image representative of the low light image. A semiconductor image chip converts the image representative of the low light image into a digital signal which may be displayed on a screen for the operator and/or which may be routed to the memory to be stored in the memory for viewing at a later date. A second lens is arranged between the screen and the semiconductor image chip to focus the image representative of the low light image onto the semiconductor image chip.

In an additional embodiment, the night vision device includes a plurality of fiber optics arranged between the screen and the semiconductor image chip to focus the image representative of the low light image onto the semiconductor image chip. The semiconductor image chip may either be a CCD or CMOS based chip for accepting the image and converting it into a digital format. Other signal processing circuitry may be utilized for converting any analog images into digital signals.

The night vision system may be provided with a variety of power supply options. For example, the image intensifier tube may be provided with an integrated first power source that is stand alone and not coupled to another power source. Likewise, the memory may be mounted into a casing that surrounds the image intensifier tube or be remote from it. Otherwise, the system may further include an embodiment wherein the second power source connects to either the first power source or a high voltage power source that surrounds one or more selected from a group consisting of the photocathode and the micro-channel plate and for providing power thereto. In a further instance, a single power source may be included in a control unit housing the memory storage device to provide power to both the memory storage device and the image intensifier tube. An audio circuit including a microphone arranged in the housing of the control unit or the image intensifier tube may be incorporated into the night vision system for simultaneously recording audio data. The entire system may be arranged atop a helmet and include a port for accepting a memory stick or flash drive.

It is an object of the invention to teach a lightweight, night vision system that can be mounted on a user and easily deployed. In one instance, the lightweight, night vision system includes a tubular image enhancer arranged in a casing that includes lobes which act as stabilizers when remotely deployed. An image transmission device is arranged in substantial proximity to the tubular image enhancer. An image detection chip is arranged in proximity to the image transmission device to convert a detected image into a digital signal representative thereof. A digital signal transmitter connects to the image detection chip and transmits the digital signals to a storage medium.

It is an object of the invention to disclose a night vision system comprising a night vision device including an image enhancer that converts a low light or no light IR image into a digital image that is stored in a digital storage medium arranged remote from the night vision device. The digital storage medium includes a separate power supply that may be harnessed to aid in operating the night vision system.

It is a further object of the invention to provide a night vision system that includes an image enhancement tube coupled to an image sensor and having a first power source. The image sensor is coupled to a digital storage medium via a military specifications cable having weatherproof connectors. The cable is a signal and/or power cable that transfers the digital images from the image sensor to the digital storage medium. The cable may also be used to relay power from a second power source to the first power source. Otherwise, the system may include a single power source. A switching circuit may be included in a casing that houses the image enhancement tube for recharging the first power source or aiding in operating the image enhancement tube and image sensor.

These and other objects and advantages of the invention will be set forth, appear in part or become apparent after considering the specification and accompanying drawings. It is to be realized that the following embodiments of the invention have been represented in their simplest form for ease in understanding the invention. Additionally, the system may be used for distant surveillance and include removable lenses. The night vision device may include multiple outputs for audio and video recordings.

DETAILED DESCRIPTION OF THE INVENTION

Figure 1A:
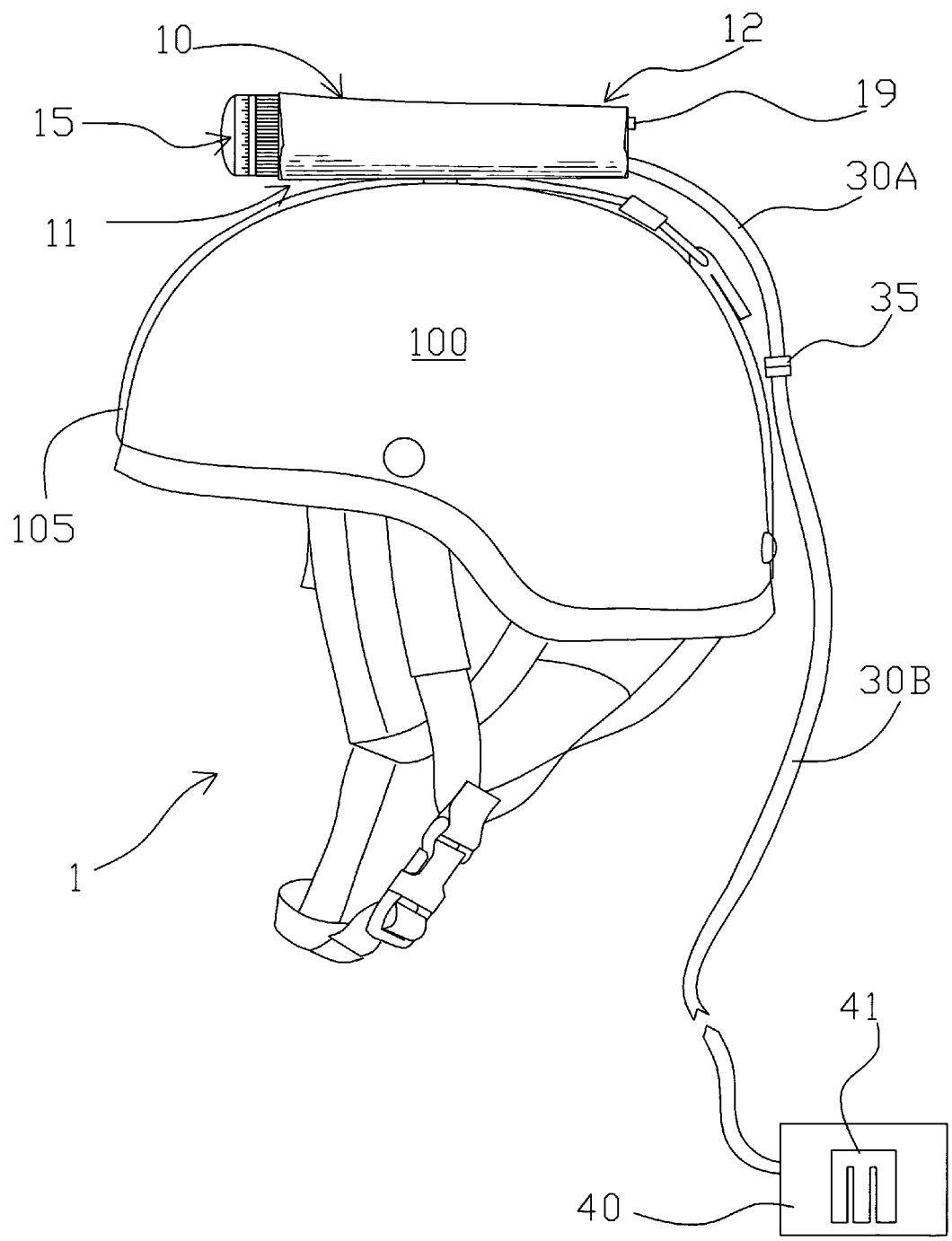
FIG. 1A is a perspective side view of the night vision system with an image intensifier device fastened atop a helmet and a control unit arranged remote there from and coupled to the image intensifier device via a cord having multiple signal and/or power conductors.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

An objective lens having a nomial field of view in a range of between seventy and one hundred millimeters degrees, preferably ninety to one hundred degrees, is arranged at a front end of the night vision device to face an object of interest. The objective lens captures light and directs it onto a photon-to-electron coverter arranged in an image intensifier tube. The photon-to-electron converter receives the photons of light captured by the objective lens and provides an output of a first plurality of electrons. The image intensifier tube includes high voltage circuitry to amplify the voltage created by a power source such, as a pair of batteries, and output a higher voltage to operate the various tube components for realizing a night vision camera device. The number of the first plurality of electrons is increased by passing them through a microchannel plate (MCP) in the tube to create a larger amount of a second plurality of electrons. The second plurality of electrons exit the MCP and are directed onto a fluorescing screen to create an accurate image of the object of interest which may be viewed by an operator or reviewed in an after action review. An image sensor is arranged in close proximity to the screen to convert the accurate image into an image signal that is stored in a digital data storage medium.

FIG. 1A shows the night vision system of the present invention 1 arranged atop a prior art helmet 100 and fastened thereto by a mounting device comprising strap 105. In a first embodiment, the image intensifier tube device 10 is preferably fastened to a strap 105 in via a strap opening formed in and arranged on a bottom of a casing 13. The image intensifier device 10 includes a front end 11 and a back end 12. An objective lens 15 is arranged at a front end of the night vision device 10 for capturing photons within the light spectrum from near infrared and visible light.

Figure 3:
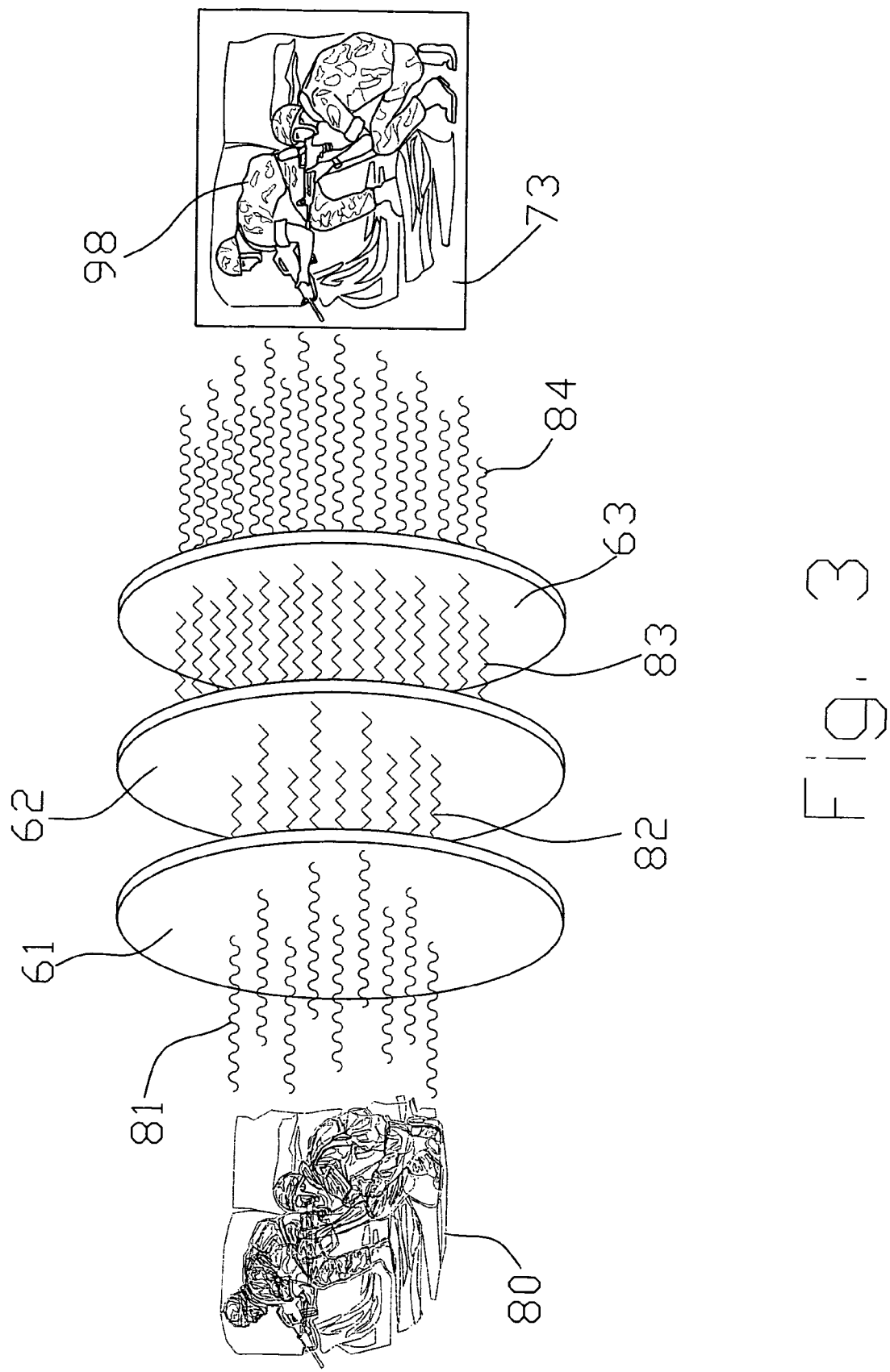
FIG. 3 shows the process steps for converting a night time or low light image to a stored image.

As can be understood by FIG. 3, photons 81 from a night image are passed through the objective lens 15 and into a photon to electron converter 61 such as a photocathode. The photocathode converts the photons into a first plurality of electrons 82 which are directed into a micro channel plate or electron multiplier 62 that converts the first plurality of electrons 82 into a second much larger plurality of electrons 83. The second plurality of electrons 83 is directed onto a phosphor or fluorescing screen 63 to produce photons 84 which create a visible image 98 of the night time image 80. This visible image is directed onto an image detector 73, such as a CCD or CMOS chip which converts the detected image into a digital signal. For purposes of this disclosure, it is to be understood that the various signal processing necessary for converting the visible image into an image signal is provided onboard the image detector 73. For example, an analog-to-digital process may be provided on the image detector 73 if it is a CMOS chip.

In the first embodiment, the back end 12 of the night vision device 10 includes a power switch 19 for energizing the components of the night vision device 10. It should be noted that if the power source for operating the image intensifier tube 10 is arranged remote from the tube 10 and in the control unit, then the power switch 19 may be located in either the tube casing or control unit casing as easily understood by the skilled artisan. In this first embodiment, a short signal-power cord 30A extends from the back end 12 and includes a connector 35 that connects to a longer signal-power cord 30B which extends from the data storage device 40. The signal-power cords may be a USB or FireWire style cord that includes both power and signal conductors arranged therein. That is, the cord may include multiple conductors which carry or transmit power and/or digital data signals. The control unit or data storage device or medium 40 includes a fastening device 41, such as clips, that fasten the control unit 40 to clothing, webbing, belts or the like. The data storage device 40 includes a hardened case that is weatherproof and shock resistant and may be formed from a variety of lightweight materials including aluminum or composite. The device 40 includes a programmable memory arranged in a shock proof configuration such that damage will be prevented when used during rugged operations. The memory device 40 may further include a software process or a mode of operation wherein pixel data from an initial frame is compared to pixel data from a sampled image to determine a difference in value. If a pixel's value changes then the pixel data is stored. Otherwise, if no changes have been made to the pixel's value then it is understood that part of the image has not changed and when signal processing occurs during an image displaying process, the part of the image with the unchanged pixel values remain the same. Thus, the invention may be left for long periods of time and the memory storage ability of the memory device is extended. The memory storage device is preferably solid state and does not include any operating drives.

Figure 1B:
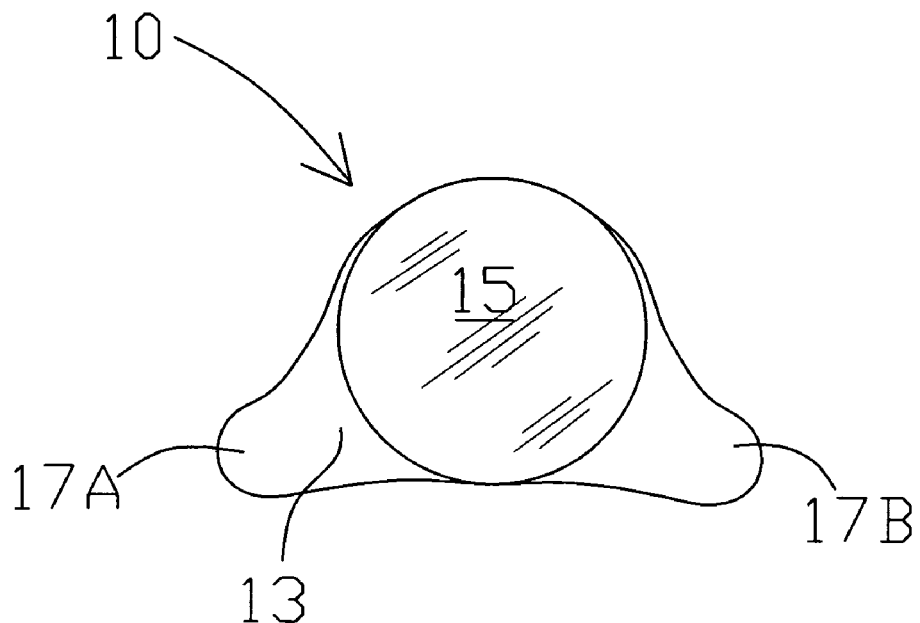
FIG. 1B is a front view of the image intensifier device.
Figure 1C:
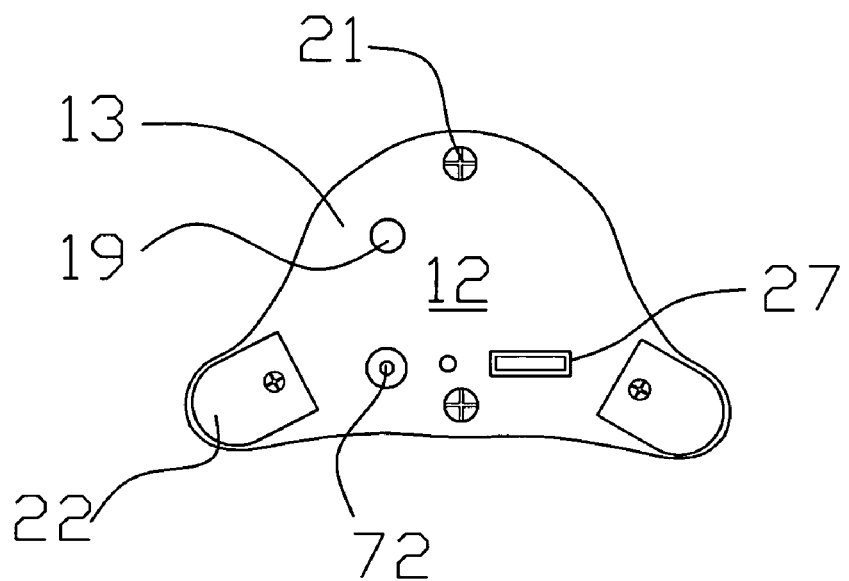
FIG. 1C is a back view of the image intensifier device.

Turning now to FIGS. 1B and 1C, a protective case 13 surrounds the night vision device 10 and may be formed from metal, composite, resin or the like. The case 13 includes a plurality of hollow elongated lobes 17A, 17B arranged on opposite sides the lens 15 and including internal contacts at opposite ends for receiving respective batteries therein and conducting voltage from ends of the batteries. As can be recognized by the various views, the bottom of the case 13 is curved to conform to the curved top of the helmet 100 in both the front to back length and side-to-side width of the device. In one embodiment, a battery is inserted through each battery access panel 22 which is accessed through a screw. Power switch 19 is provided for energizing the night vision device 10 and is a sealed switch that preferably includes a rubber dust boot overlaying the switch to prevent contamination of the internal workings of the switch. Screws 21 may be removed to provide access to the internal working components within the device 10 for cleaning and servicing operations. A weatherproof connector 27 is provided on the back side 12 of the night vision device 10 for accepting an end of wire 30A to provide digital images to the data storage device 40. A second analog port 72 is provided for coupling the night vision device to a small handheld screen for selecting a distance object of interest and focusing the lens thereon. A dust cover, not shown, may be attached to the case for protecting the various parts from contamination by dust.

Figure 2A:
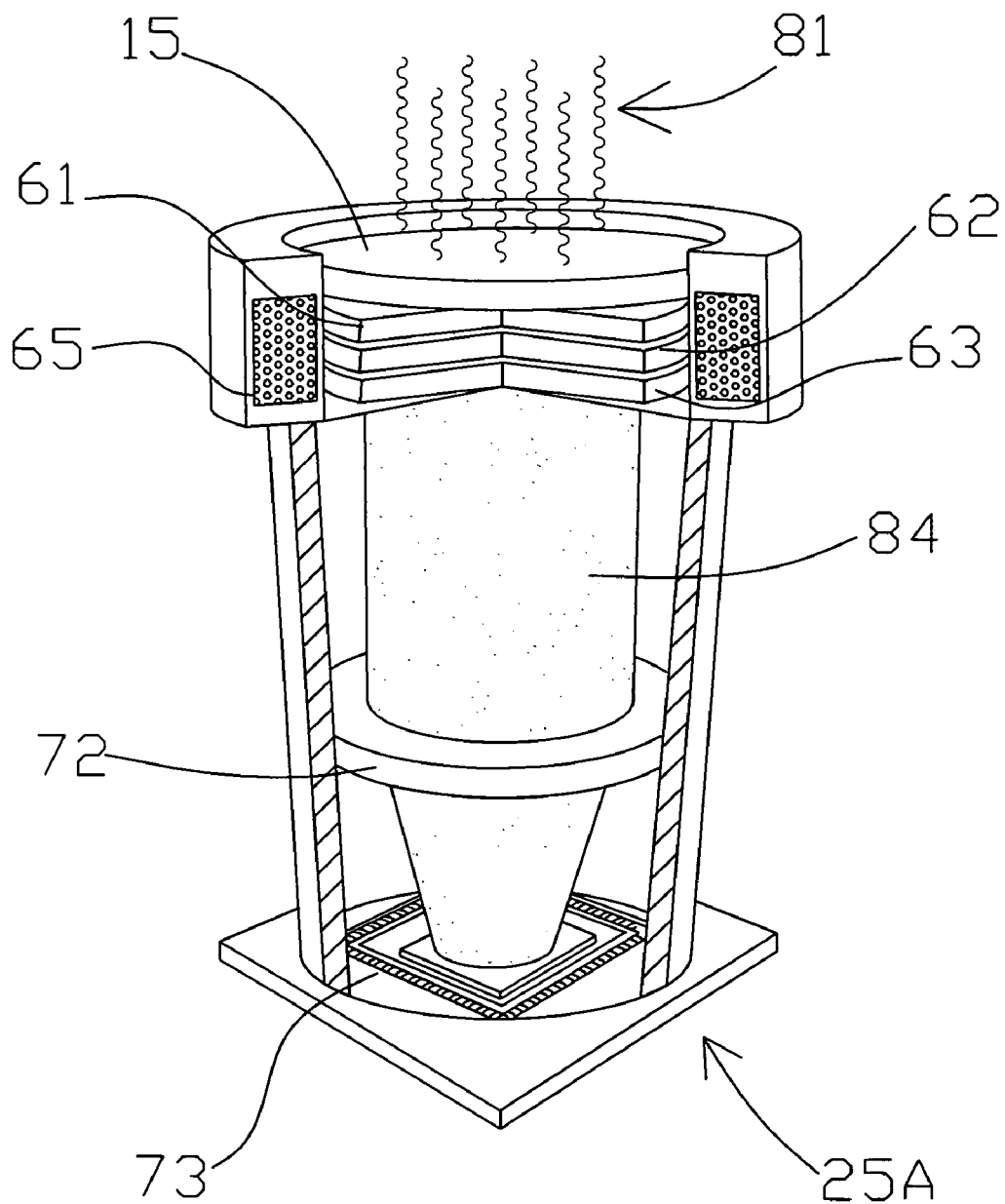
FIG. 2A shows a first embodiment of the invention where a second lens is used to focus an image on the illuminated screen onto an image detection chip.
Figure 2B:
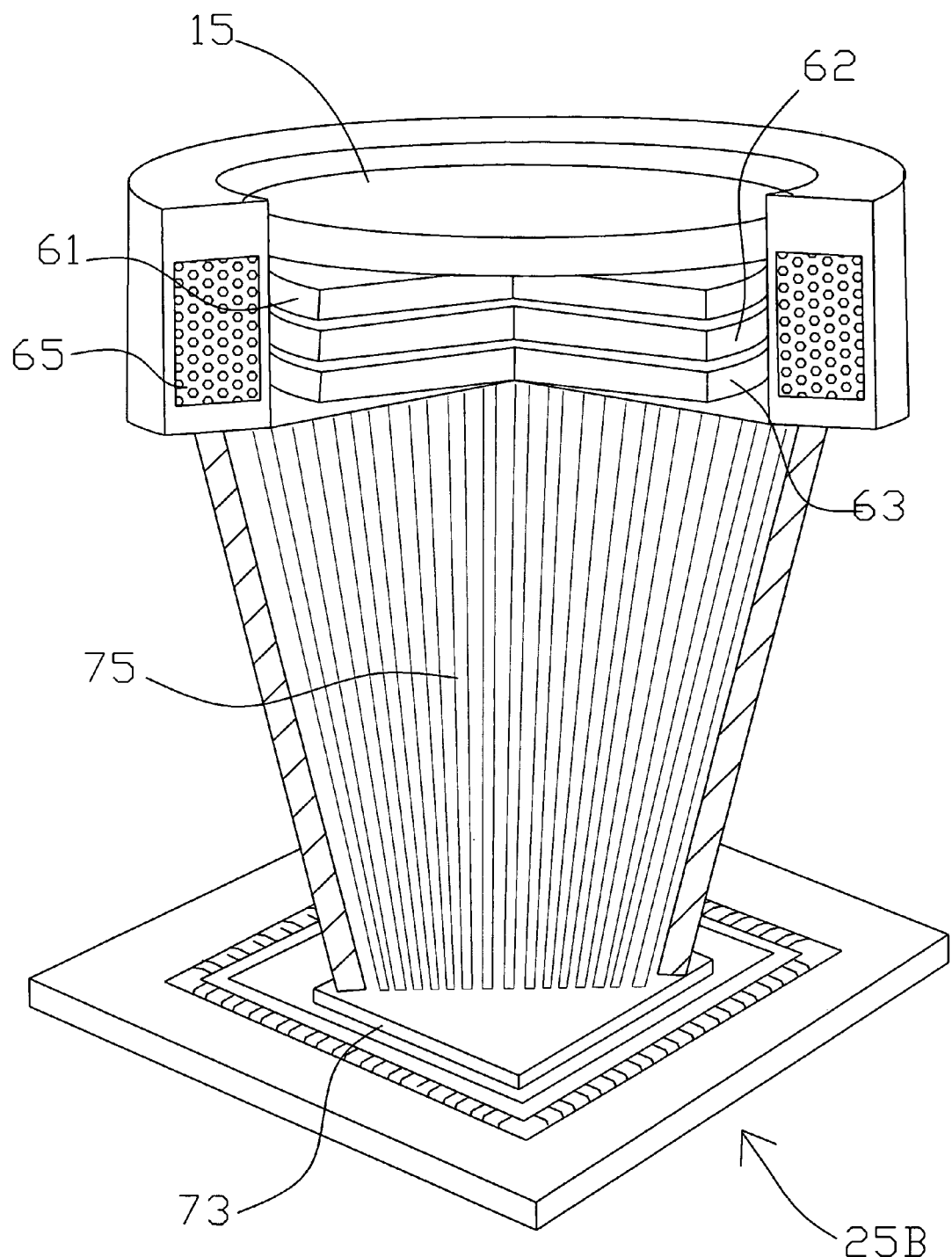
FIG. 2B shows a second embodiment of the invention where a plurality of fiber optics directs the displayed image onto the image detection chip.
Figure 2C:
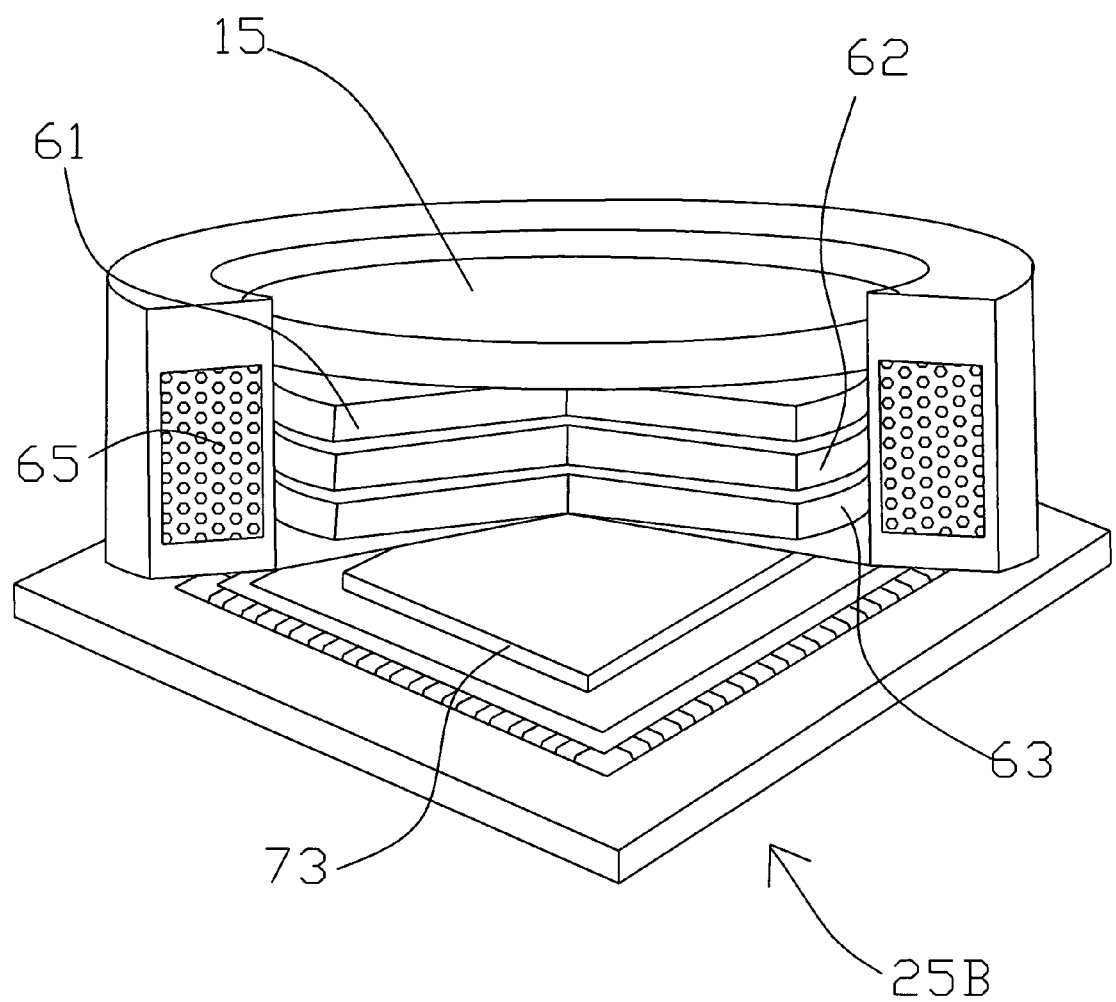
FIG. 2C shows a third embodiment of the invention wherein, the illuminated screen is disposed in close proximity to the image detection chip.

FIGS. 2A and 2B show two different configurations of an intensifier tube 25A, 25B. In one instance, the image intensifier tube is arranged atop the helmet 100. In an alternative embodiment, the image intensifier tube is arranged on one side of the helmet 100. In FIG. 2A, photons 81 enter the objective lens 15 and are converted into electrons via photocathode 61. An electron multiplier 62 increases the number of electrons and directs them onto screen 63 which emits photons 84 that are focused onto an image sensor 73 via lens 72. High voltage power source 65 is provided around the photocathode 61, electron multiplier 62 and screen 63. The image sensor connects to a signal conductor arranged within connector 27 to provide digital images to the memory device 40. As can be understood by viewing FIG. 2B, the photons emitted by screen 63 are directed onto the image sensor 73 via a fiber optic coupler 75 that includes a bundled, tapered plurality of fibers. FIG. 2C shows a third embodiment of the invention wherein, the illuminated screen is disposed in close proximity to the image detection chip. In this instance, there is no relay lens or fiber optic bundles to relay the image onto the image detection chip. Thus, the image screen 63 and the image detection chip are arranged substantially near one another to reduce the overall length of the image intensifier tube. The image sensor converts the image projected thereon into a digital or analog signal as discussed herein.

Figure 4:
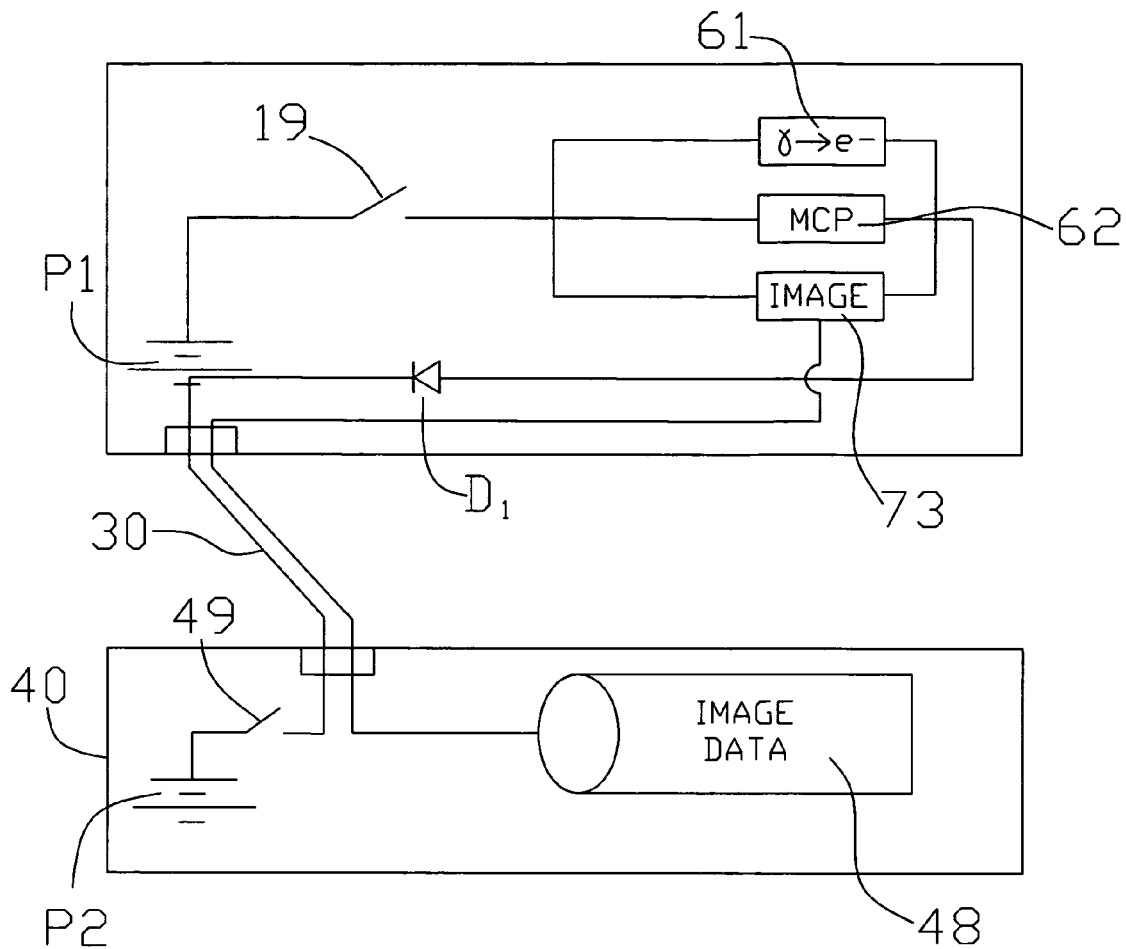
FIG. 4 shows a first electrical schematic for sharing the power between the night vision device and the data storage device.

FIG. 4 shows a schematic having two power sources and how a first power source P1 may be supplied with energy by the second power source P2. Cables 30A, 30B are collectively represented as element 30 in this schematic view. When switch 19 is closed, power is flowed into the photocathode 61, MCP 62, and image sensor 73. Over time the magnitude of the voltage of P1 decreases. Switch 49 may be closed through electronic circuitry or manually by the operator to couple power source P2 to P1 for aiding in powering the device 10. Database 48 is also powered by power source P2. Diode D1 may be provided for ensuring that a potential will be seen across the various devices 61, 62, 63 when P2 is coupled to P1. A microphone circuit and corresponding components including conductors and signal processors may be included for recording sound to the database 48.

Figure 5:
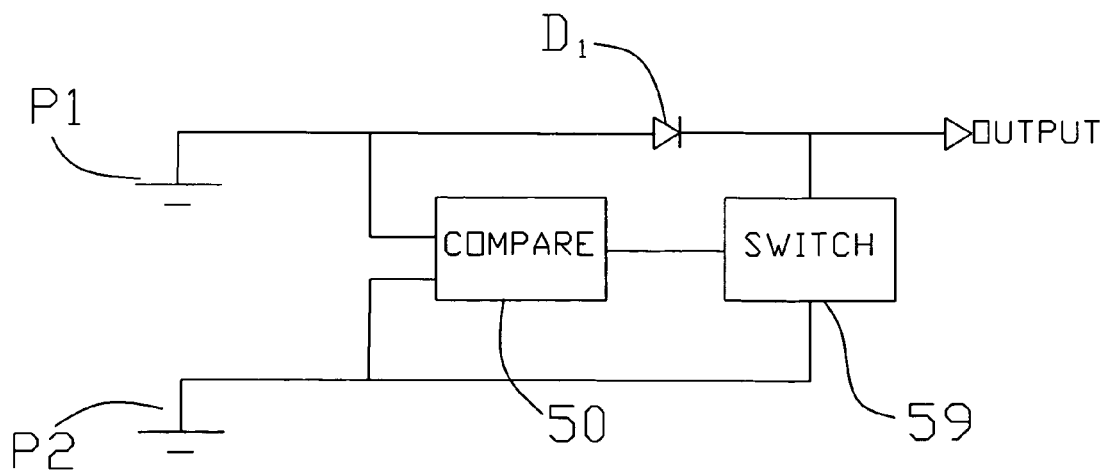
FIG. 5 is a second electrical schematic of the night vision system including a comparator circuit that turns on when a voltage potential measured across the first power source drops below a preset threshold when compared to the voltage potential of the second power source.

FIG. 5 shows an electronic circuit that may be included in either the image intensifier tube device 10 or the data storage device 40. P1 and P2 are connected to inputs of a comparator chip 50. When P1 drops to a predetermined magnitude, comparator 50 provides an output signal to switch 59, which may be a transistor, relay or the like that allows P2 to be output to drive the various components arranged in night vision 10. Diode D1 prevents power from flowing back into P1.

Figure 6:
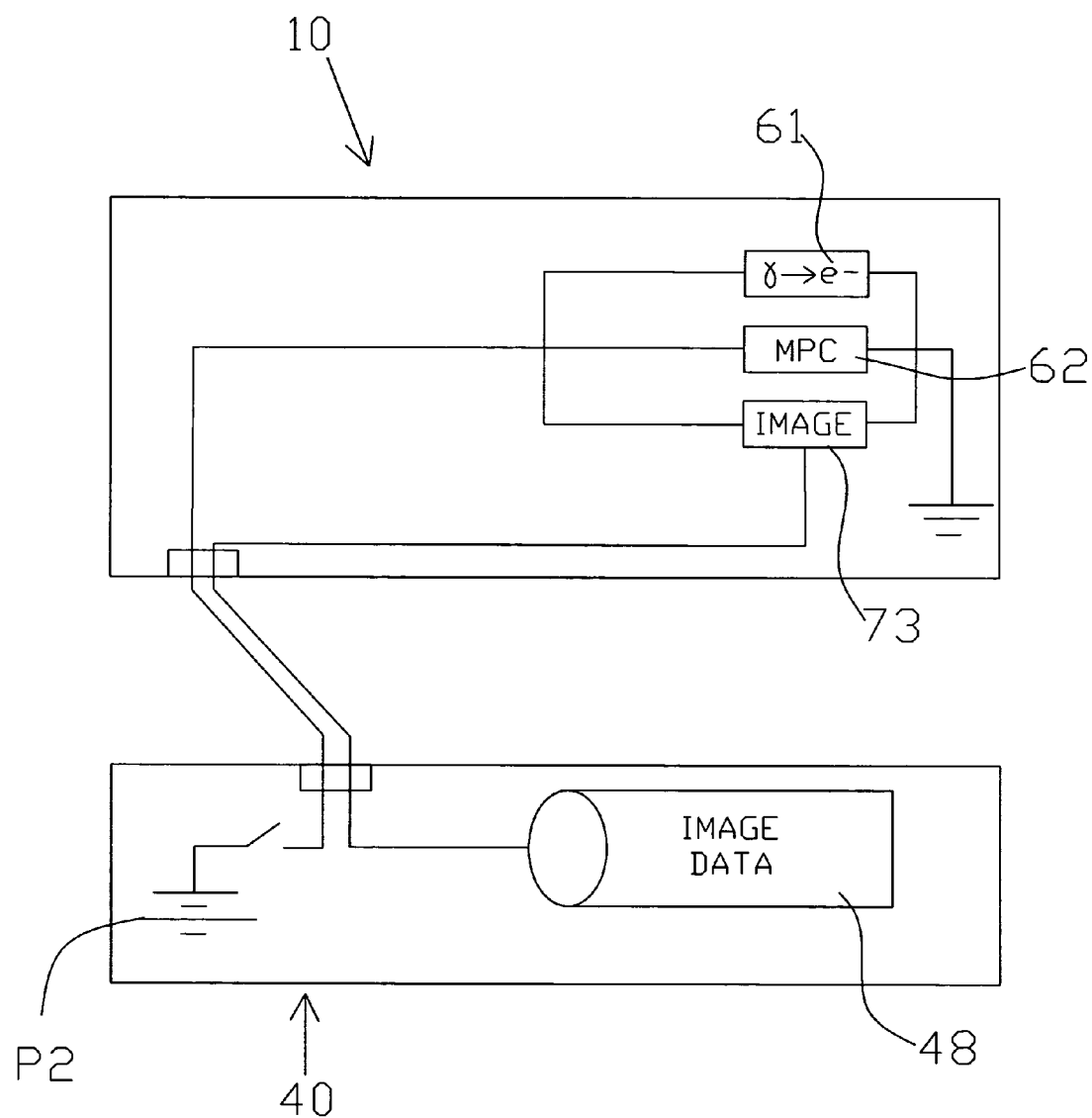
FIG. 6 is a third electrical schematic of the night vision system wherein a single power source is arranged in the control unit that houses the data storage device.

FIG. 6 is a third electrical schematic of the night vision system wherein a single power source is arranged in the data storage device or control unit 40. In this instance, a single power source is provided in the memory storage device. This power source provides a voltage supply to both the memory storage device and the night vision device as shown.

Figure 7A:
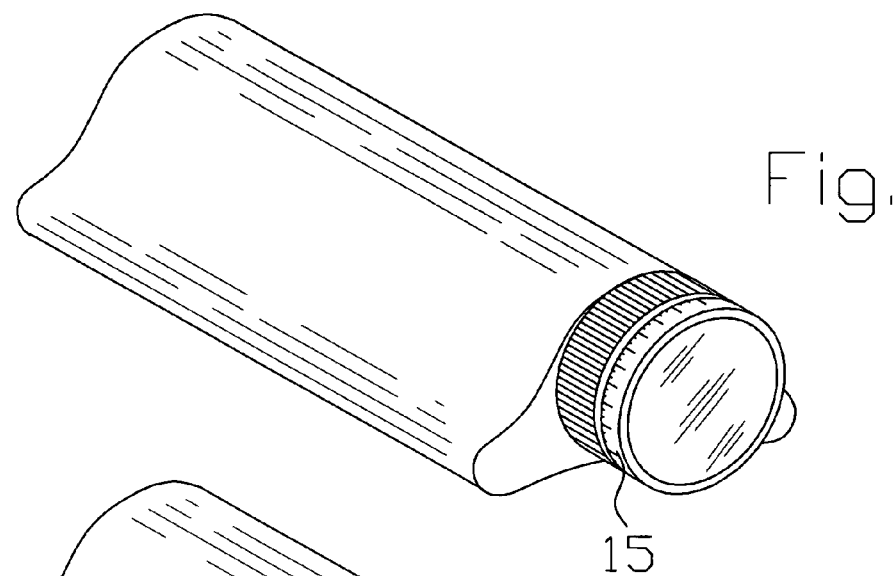
FIG. 7A shows a front perspective view of the housing of the image intensifier tube equipped with an adjustable zoom lens having graduated marks for focusing the first lens at a distance.
Figure 7B:
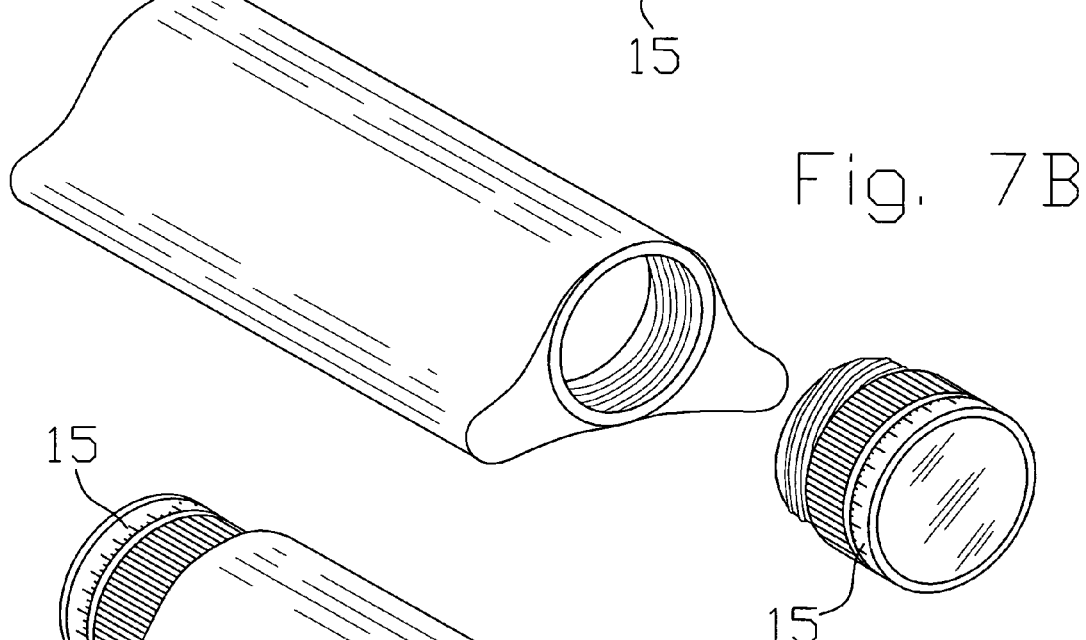
FIG. 7B shows the housing with the zoom lens removed.
Figure 7C:
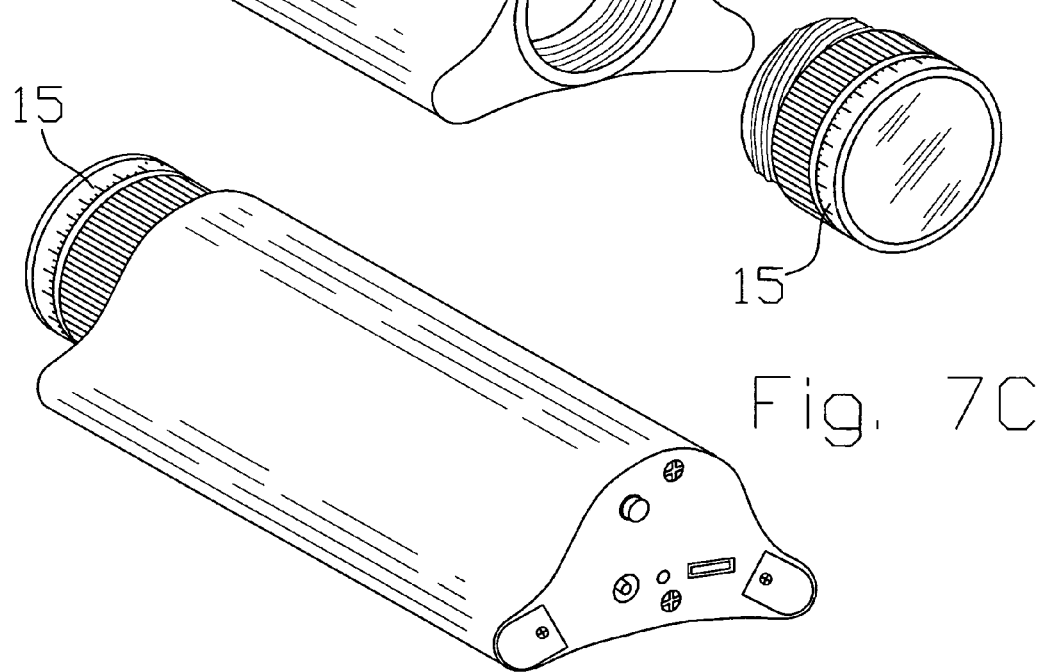
FIG. 7C is a back perspective view of the housing of the image intensifier device and showing a power switch and a pair of signal and/or power ports.
Figure 8:
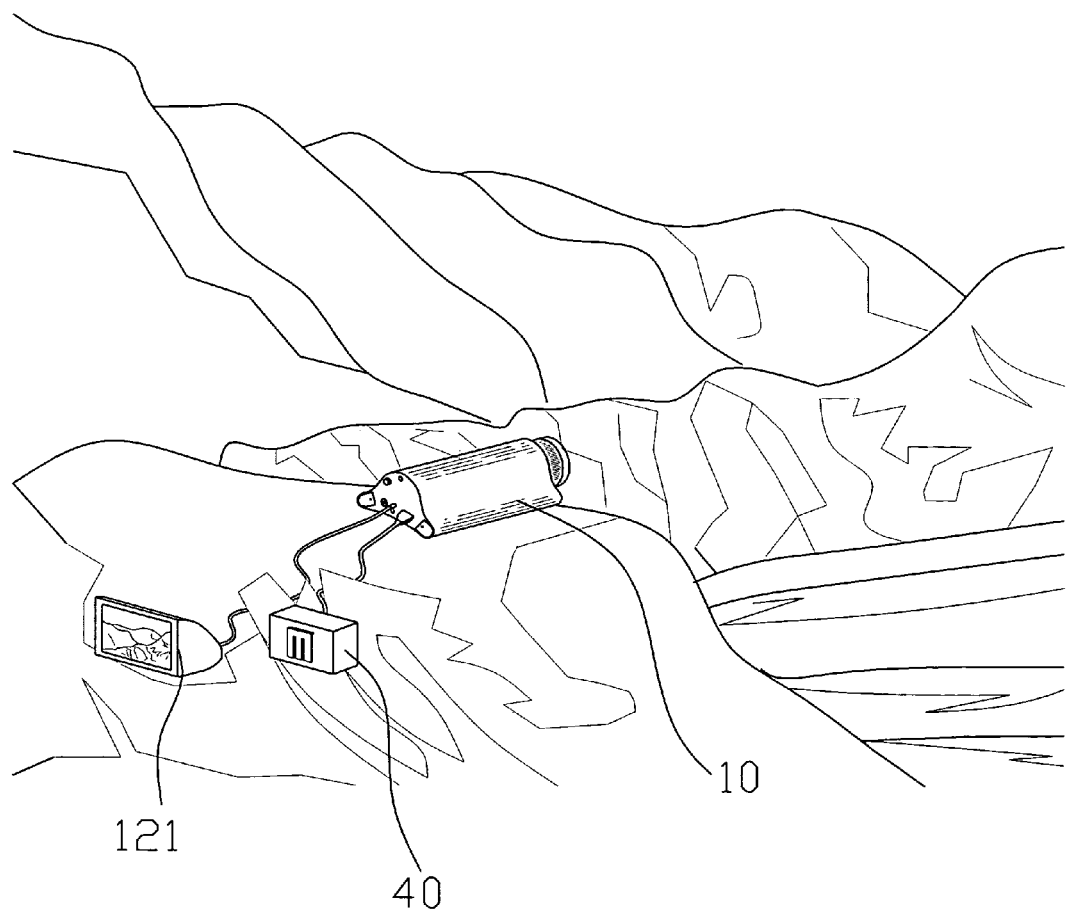
FIG. 8 shows the night vision system deployed in a remote operating condition and having a small display screen 121 coupled to one of the signal ports. In this instance, an operator can arrange the night vision device atop an element of the terrain and continually monitor a particular object of interest without being exposed.

FIGS. 7A-7C shows the night vision device with an adjustable zoom lens 15 having graduated marks for focusing the first lens at a distance. The lens is equipped with external threads that mate with the internal threads provided on within the opening that receives the lens, as shown. This type of coupling between the lens and the night vision device may be a C-coupler as used in camera equipment. In either case, the lens may be quickly removed and replaced. In FIG. 7C, the device is equipped with the various features as previously discussed.

All components disclosed herein are configured for use in all types of weather conditions. All components should comply with U.S. Military Specifications. Various dust covers, dust boots, rubber seals, gaskets and the like may be used to cover the various parts of the system.

Figure 9A:
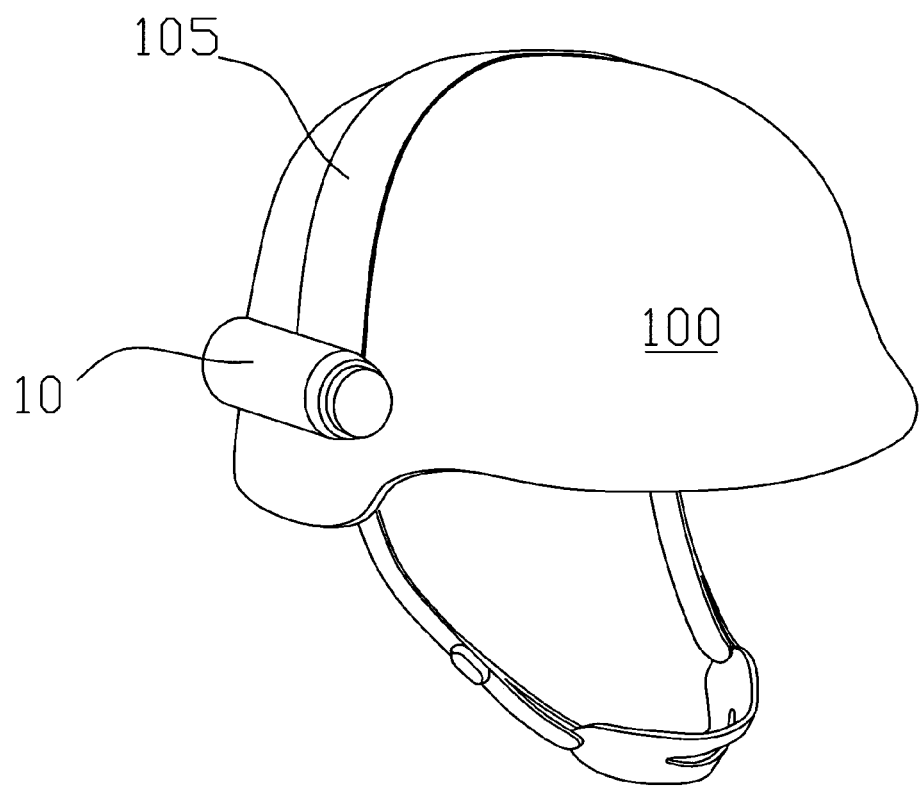
FIG. 9A is a front view of an additional embodiment of the invention showing the image intensifier device mounted on an opposite side of a protective helmet from a control unit that comprises a memory and power source. A strap passes across the top of the protective helmet and couples the control unit and the image intensifier unit together.
Figure 9B:
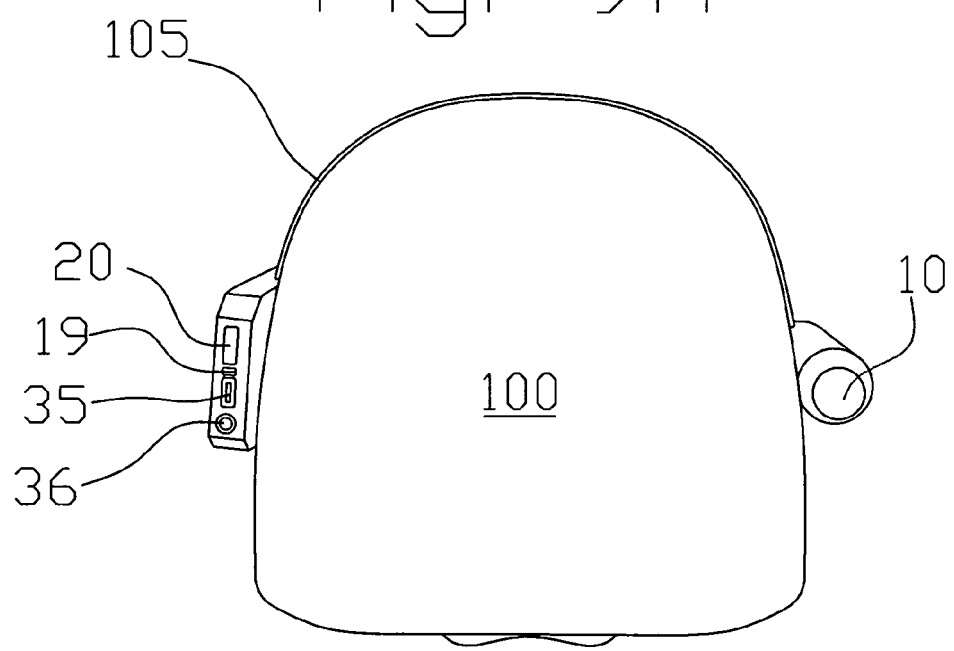
FIG. 9B is a back view of the system and showing the control unit and associated features present thereon.

FIGS. 9A and 9B show an alternative arrangement and showing the image intensifier tube 10 and the control unit 40 which includes the memory mounted on opposite sides of the helmet 100. A power source is included in the control unit and may be configured as previously mentioned. A strap 105 is a mounting means for mounting both the image intensifier tube 10 and the control unit 40 to the helmet 100. Strap 105 passes across the top of the protective helmet 100 and couples the control unit 40 and the night vision device 10 together. In this instance, the strap 105 comprises power and signal wires coupling the control unit 40 to the image intensifier tube 10 to provide data signal and power there between. The strap may be a Velcro strap that couples the system to the helmet. It is preferred that the image intensifier tube 10 is substantially the same weight as the control unit 40 to balance the two on the helmet without creating an unbalanced load on the operator's neck. The objective lens provided on the image intensifier tube is preferably a wide angle lens with an angle of substantially ninety to one hundred degrees. The image intensifier tube is preferably equipped with a black and white CMOS image sensor that produces a digital High Definition signal having a resolution of 1920/1080p and a video screen ratio of 16:9. It is understood that other resolutions may be provided as well as different screen viewing ratios.

FIG. 9B is a back view of the system and showing the control unit 40 and associated features present thereon. In this instance, the control unit 40 includes a positive on/off switch 19, an erase/format button 20, a Universal Serial Bus output port 35 for use with viewing screens/glasses/downloading stored images from the memory. The USB output port 35 may also be used for recharging onboard batteries or power source of the control panel. A separate DC power port 36 is also shown for use in providing an alternative power source or recharging the onboard batteries or power source. It is preferred that the control panel includes at least a 16 GB solid state memory. The onboard power source may be 3-4 hour Lithium rechargeable batteries.

Figure 10:
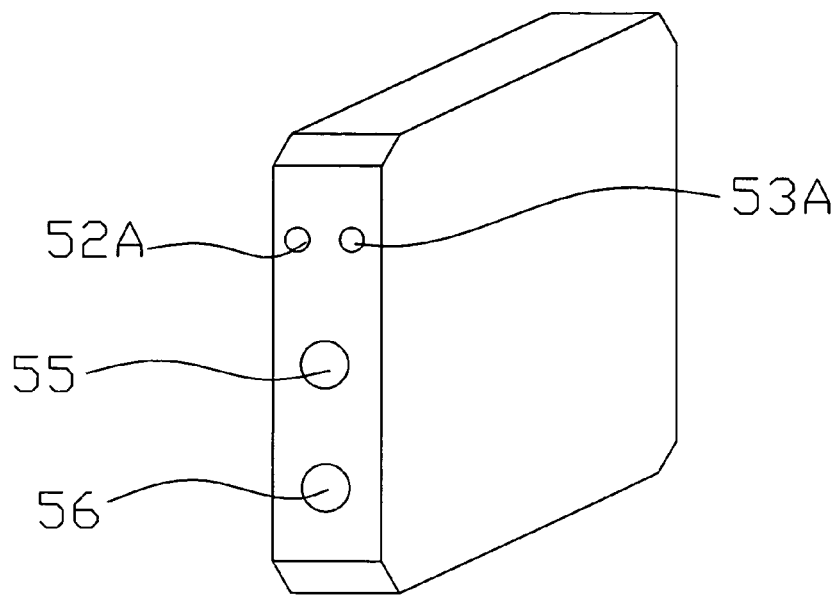
FIG. 10 is a front view of the control unit and exhibiting a plurality of openings having a pair of microphones, a pinhole camera and a photocell mounted therein.

FIG. 10 is a front view of the control unit 40 and exhibiting a plurality of openings having microphones 52A, 52B, a pinhole camera 55 and a photocell 56 mounted therein. The microphones 52A, 52 operate as left and right microphones for providing a stereo sound recording that is stored in the memory of the control unit. The pinhole camera 55 operates as a daytime camera for recording digital images to the memory during daylight hours. The photocell 56 functions as a switching mechanism, in accord with the schematic of FIG. 11 to automatically switch inputs to the memory between the daylight pinhole camera 55 and the image intensifier tube 10.

Figure 11:
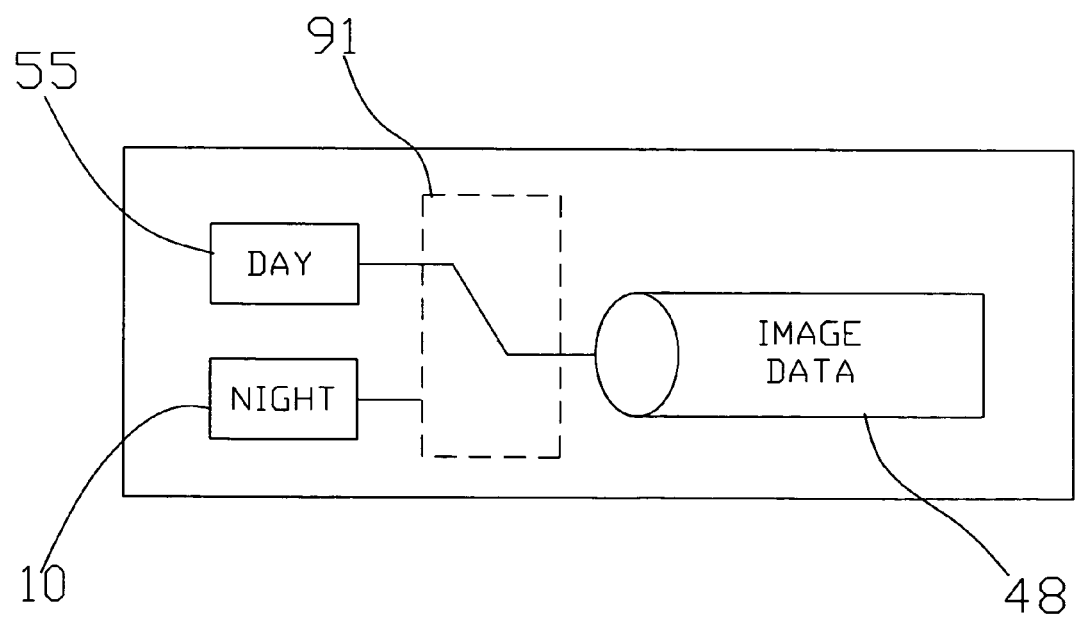
FIG. 11 is a schematic view of an additional embodiment of the invention and showing the photocell that switches between the pinhole camera (daytime) and the image intensifier device.

FIG. 11 is a schematic view of an additional embodiment of the invention and showing the photocell that switches between the pinhole camera (daytime) and the night vision device. As can be understood by the skilled artisan, the photocell operates in conjunction with a comparator (not shown) to bias the comparator into a particular state whereby either the output of the daytime camera 55 is sampled and stored during daylight hours or the output of the image intensifier tube 10 is sampled and stored during nighttime hours. In this manner, the operator does not need to switch between the two different cameras. It may be recognized that switch 91 may also be manually configured to provide an input to the image data storage device 48.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A hands free night vision system comprising:
an image intensifier tube having a first end and a second end, said first end having an objective lens that accepts photons from a low light image of an object of interest and converts said photons into an electronic signal representative of the low light image of the object of interest, an output arranged at the second end of the image intensifier tube that outputs the electronic signal representative of the low light image of the object of interest, said image intensifier including a protective case;
a power source coupled to the image intensifier and providing power thereto to convert the photons into the electronic signal representative of the low light image of the object of interest;
a control unit coupled to the second end of the image intensifier tube and comprising a memory that accepts and stores the electronic signal representative of the low light image of the object of interest;
a mounting device for mounting the image intensifier tube onto a protective helmet; and
a signal cable arranged between the image intensifier tube and the control unit that transmits the electronic signal there between.

2. The hands free night vision system of claim 1 wherein said mounting device is a strap that passes from a left side of the helmet to a right side of the helmet to secure the image intensifier tube and the control unit thereto.

3. The hands free night vision system of claim 1 wherein said mounting device is a strap fixed to the helmet and passing from a front to a back thereof and securing the image intensifier tube to the top of the protective helmet.

4. The hands free night vision system of claim 1 wherein said mounting device is a Velcro strap.

5. The hands free night vision system of claim 1 wherein the control unit comprises a pair of microphones that generate sounds which are recorded in the memory, a pinhole camera which operates during daytime hours to produce images which are sampled and stored in the memory and a switch for switching input to the memory between the image intensifier tube and the pinhole camera.

6. The hands free night vision system of claim 5 wherein the switch for switching the input to the memory between the image intensifier tube and the pinhole camera comprises a photocell that automatically detects whether the system is operating during daytime or nighttime hours.

7. The hands free night vision system of claim 1 wherein said memory is a solid state memory.

8. The hands free night vision system of claim 1 wherein said control unit includes a positive on/off switch, an erase/format button, and a Universal Serial Bus (USB) output port for use with viewing screens or glasses or downloading stored images from the memory, said USB output port also being used for recharging onboard batteries or power source of the control panel.

9. The hands free night vision system of claim 1 wherein said memory is a 16 GB solid state memory.

10. The hands free night vision system of claim 1 wherein said objective lens is a wide angle lens having a viewing angle substantially between ninety and one hundred degrees.

11. The hands free night vision system of claim 1 wherein said objective lens is a zoom lens.

12. The hands free night vision system of claim 1 wherein the objective lens is coupled to the image intensifier tube by a threaded C-coupler.

13. The hands free night vision system of claim 1 wherein the image intensifier tube comprises an image sensor that is one of a charge coupled device or a complementary metal oxide semiconductor device.

14. A hands free night vision system that comprises:
a helmet-mounted image intensifier tube having a first end comprising an objective lens that accepts photons and a second end that provides digital image signals that include digital images, said intensifier tube converting a low light image into a plurality of digital image signals that are decoded to create surveillance images;

a first power source that provides power to the helmet mounted image intensifier tube and being connected to the image intensifier tube;

a casing in which the helmet-mounted image intensifier tube is housed, said casing including recesses with access openings for depositing batteries into the recesses to create a voltage potential in the first power source;

a signal-power port arranged in said casing for accepting at least a signal end of a signal cable;

a signal cable having a first signal end arranged in the signal-power port of the casing, said signal cable including a second signal end that transmits at least digital images there through;

an electronic storage medium having a signal port for accepting the second end of the signal cable to receive digital images from said helmet-mounted image intensifier tube; and a second power source connected to said electronic storage medium and for providing power thereto.

15. The image intensifier tube of claim 14 further comprising:

wide angle objective lens arranged at the first end of the helmet-mounted image intensifier tube, said helmet-mounted intensifier tube further including a circuit that steps up the voltage potential in the first power source to a high voltage potential;

a photocathode arranged in proximity to the first lens, said photocathode converting photons received by the first lens into a first plurality of electrons;

a micro-channel plate arranged in proximity to the photocathode to convert the first plurality of electrons into a second plurality of electrons having a larger magnitude than the first plurality of electrons;

a screen arranged in proximity to the micro channel plate and being struck by the second plurality of electrons, said screen comprising a material that fluoresces when struck by the second plurality of electrons to produce an image representative of the low light image; and, a semiconductor image chip that converts said image representative of the low light image into a digital signal; and a second lens arranged between said screen and said semiconductor image chip to focus the image representative of the low light image onto the semiconductor image chip.

16. The image intensifier tube of claim 14 further comprising:

a zoom lens arranged at the first end of the helmet-mounted image intensifier tube, said helmet-mounted intensifier tube further including a circuit that steps up the voltage potential in the first power source to a high voltage potential;

a photocathode arranged in proximity to the first lens, said photocathode converting photons received by the first lens into a first plurality of electrons;

a micro-channel plate arranged in proximity to the photocathode to convert the first plurality of electrons into a second plurality of electrons having a larger magnitude than the first plurality of electrons;

a screen arranged in proximity to the micro channel plate and being struck by the second plurality of electrons, said screen comprising a material that fluoresces when struck by the second plurality of electrons to produce an image representative of the low light image;

a semiconductor image chip that converts said image representative of the low light image into a digital signal; and a plurality of fiber optics arranged between said screen and said semiconductor image chip to focus the image representative of the low light image onto the semiconductor image chip.

17. The night vision system of claim 14 wherein said second power source connects to a high voltage power source that surrounds one or more selected from a group consisting of the photocathode and the micro-channel plate and for providing power thereto.

18. A night vision system that comprises:

a helmet-mounted image intensifier tube having a first end that accepts photons and a second end that provides digital image signals, said image intensifier tube converting a low light image into a digital image signal;

a power source that provides power to the helmet mounted image intensifier tube and being remote from the image intensifier tube;

a casing in which the helmet-mounted image intensifier tube is housed, said casing including recesses with access openings for depositing batteries into the recesses to create a voltage potential in the first power source;

a signal-power port arranged in said casing for accepting at least a signal end of a signal cable;

a signal cable having a first end arranged in the signal-power port of the casing, said signal cable including a second end that transmits at least digital images there through; and an electronic storage device having a database that stores images and a hardened exterior that includes a signal port for accepting the second end of the signal cable to receive digital images from said helmet-mounted image intensifier tube to save said image in the electronic storage device.

* * * * *